United States Patent [19]

Lewis et al.

[11] 4,064,161

[45] Dec. 20, 1977

[54] POLYMERS HAVING PENDANT ACRYLATE AND METHACRYLATE FUNCTIONALITY

[75] Inventors: Sheldon N. Lewis, Willow Grove; Richard A. Haggard, Fort Washington, both of Pa.

[73] Assignee: Rohm and Haas Company, Philadelphia, Pa.

[21] Appl. No.: 517,335

[22] Filed: Oct. 23, 1974

Related U.S. Application Data

[63] Continuation-in-part of Ser. No. 371,921, June 20, 1973, abandoned, which is a continuation-in-part of Ser. No. 137,057, April 23, 1971, abandoned.

[51] Int. Cl.$^2$ ............................................. C07C 69/54
[52] U.S. Cl. ................................... 526/320; 526/84; 526/210; 526/328.5; 526/329.7; 560/224
[58] Field of Search .......................... 260/486 R, 484 B

[56] References Cited

U.S. PATENT DOCUMENTS

| 2,956,990 | 10/1960 | Fettes | 260/486 R |
| 3,317,483 | 5/1967 | Verdol | 260/486 R |
| 3,627,820 | 12/1971 | Chujo et al. | 260/486 |

FOREIGN PATENT DOCUMENTS

| 1,054,018 | 1/1967 | United Kingdom | 210/486 |

OTHER PUBLICATIONS

Shimomura et al., Kogyo Kagaku Zasshi, 1968 71/7 pp. 1070–1074.
Trekoval et al. Cemicky Prumysl, 18(6) p. 312 (1968).
Trekovel et al. Jrnl. of Polym. Science, Part C, vol. 4, p. 333 (1963).
Kanai et al. Kogyo Kagaku Zasshi 68(10) 1947 (1965).

*Primary Examiner*—Paul J. Killos
*Attorney, Agent, or Firm*—Harold L. Greenwald; William E. Lambert, III

[57] ABSTRACT

Polymers of esters of methacrylic acid having an average chain length of about 6 to about 50 mers are prepared by an anionic polymerization reaction, carried out in the presence of a chain-regulating alcohol and a catalytic amount of an alkoxide anion, in which control of the molecular weight and molecular weight distribution of the polymer are achieved by regulating the ratio of the total quantity of alcohol employed to the total monomer charge. These polymers, their hydrolysis products, or their hydroxyl-containing derivatives are esterified or transesterified to give polymers having pendant acrylate or methacrylate functionality which are useful in formulating films, coatings, inks, and the like.

11 Claims, No Drawings

POLYMERS HAVING PENDANT ACRYLATE AND METHACRYLATE FUNCTIONALITY

CROSS-REFERENCE TO RELATED APPLICATIONS

This application is a continuation-in-part of our pending application U.S. Ser. No. 3,711,921, filed June 20, 1973, which is a continuation-in-part of our pending application U.S. Ser. No. 137,057, filed on Apr. 23, 1971, both abandoned.

This invention relates to novel homopolymers and copolymers and esters of methacrylic acid which have pendant acrylate or methacrylate functionality compositions which comprise these novel polymers, to methods of making the polymers, and to uses of the polymers.

Polymers having relatively low molecular weights, often referred to as oligomers, have recently become of increasing interest, in part due to their use in adhesives, plasticizers, leveling agents, and melt-index improvers, and in formulating coating compositions having very high solids content. While various alkyds, polyesters, polyethers, polyamides, and polyurethanes having molecular weights in the range of 500 to 2500 can be conveniently prepared, suitable acrylic polymers in this molecular weight range have heretofore been inaccessible. Because acrylic polymers have many extremely valuable advantages, including relatively low cost, low color, good outdoor durability, high chemical resistance, and good thermal stability, and because the various non-acrylic low molecular weight polymers with functionalities greater than two are often difficult to prepare, polymer compositions comprising low molecular weight acrylic polymers would be particularly desirable.

Attempts have been made to prepare acrylic polymers having molecular weight distributions in the range of 2500 to 10000 by free radical polymerization techniques. However, these procedures are generally unacceptable, either because high temperature or high pressures are needed to carry out the polymerization reaction, because the chain transfer agent employed in the reaction has an objectionable odor or toxicity, or because the properties of the polymer produced in the polymerization reaction are adversely affected by a high incidence of initiator or chain transfer fragments in the polymer chains. Furthermore, it is difficult to control the molecular weight distribution of polymers prepared by free radical techniques. Thus, such polymers tend to have a broad molecular weight distribution, and contain significant amounts of high molecular weight polymer, which can give unattractive properties to the polymer compositions. It has now been found that novel polymer compositions free of the undesirable properties of prior art materials can be prepared by a novel anionic polymerization technique, which allows control of the polymer chain length and of the molecular weight distribution of the polymer.

According to the invention, novel polymer compositions are provided which comprise an anionically-polymerized addition homopolymer of an ester of methacrylic acid, or an anionically-polymerized addition copolymer of esters of methacrylic acid which have been postreated to provide polymers having pendant acrylate or methacrylate functionality. In the polymer compositions of the invention, the homopolymer or copolymer has an average chain length of about 6 to about 50 mers. In one preferred embodiment, the average chain length will be about 6 to about 25 mers, and in another preferred embodiment, the average chain length will be about 8 to about 20 mers.

The polymers of the invention are characterized by having not only low molecular weight, but also very narrow molecular weight distribution. Generally, at least about 85% by weight of the molecules of the homopolymer or copolymer in the polymer compositions have chain lengths falling between $\sqrt{2\bar{n}}$ and $2\bar{n}$, where $\bar{n}$ is the average chain length of the polymer. Thus, when the average chain length of the homopolymer or copolymer is about 6 mers, at least about 85% by weight of the molecules of the homopolymer or copolymer generally have chain lengths of about 3 to 12 mers, and when the average chain length of the homopolymer or copolymer is about 25 mers, at least about 85% by weight of the molecules of the homopolymer or copolymer generally have chain lengths of about 7 to about 50 mers. In a preferred embodiment of the invention, at least about 85% by weight of the molecules of the homopolymer or copolymer in the polymer compositions will have a chain length of about 4 to 40 mers. Depending upon the particular ester of methacrylic acid which is employed, and the particular comonomer which may be employed, the polymer compositions of the invention will have a molecular weight distribution (weight average molecular weight, $\overline{M}w$) in the range of about 400 to about 10,000, and preferably about 500 to about 2500. The dispersities (ratio of weight average molecular weight to number average molecular weight) of the polymer compositions of the invention are also quite low, generally being about 1.1 to about 3, preferably less than about 2, and most preferably less than about 1.5.

The polymers of the invention comprise mers having the structure

wherein Z is an acryloyloxyalkyl or methacryloyloxyalkyl group, preferably having up to 4 carbon atoms in the alkyl portion.

If the polymers contain less than 100% of the functional mers as defined above, they will generally also comprise mers of the structure

wherein Z' is an alkyl group, preferably having 1 to 24 carbon atoms.

In a preferred embodiment of the invention, the polymers have about 8 to about 70 mole percent of pendant acrylate or methacrylate functionality.

The polymer compositions of the invention are produced from polymers having been prepared by the anionic homopolymerization of an ester of methacrylic acid, or by the anionic copolymerization of an ester of methacrylic acid with at least one other copolymerizable monomer thus producing, in the polymer, mers derivable from other alkoxide copolymerizable monomers. The anionic polymerization reaction is carried out in the presence of an alkoxide anion, which serves as a catalyst, and an alcohol, which serves as a chain-regulating agent. The polymers which are used as percursors in making the polymers of the invention are described and claimed in our United States patent applications Ser. No. 517,337 ,entitled "Novel Methacrylic Polymers Having Condensation-Crosslinkable Functionality" and Ser. No. 517,336, entitled "Novel Polymers of Alkyl Methacrylates," filed on even date herewith, assigned to a common assignee, and incorporated herein by reference.

In general, most of the homopolymers, from which the polymer compositions of the invention are prepared can be represented by the following formula:

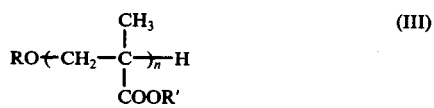

wherein
RO represents the residue of the chain-regulating alcohol used in the polymerization reaction,
R'O represents the alcohol portion of the monomeric ester of methacrylic acid, and
$n$ is an interger of 3 to 90, preferably 4 to 40, most preferably 5 to 25, and represents the chain length of the polymer.

The copolymers from which the polymer compositions of the invention are prepared can be similarly represented, in general, by the following formula:

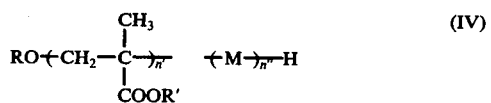

wherein
RO and R'O are as defined above,
M represents the residue of the interspersed comonomer or comonomers, and
$n'$ and $n''$ are integers of one or more, wherein the sum of $n'$ and $n''$ is 3 to 90, preferably 4 to 40, and most preferably 5 to 25.

It should be noted that the copolymers represented by Formula IV represent polymers of two or more monomers, and are random copolymers, so that formula IV is only a simplified representation of the composition of these copolymers, and does not attempt to show their physical stereochemical structure. Furthermore, it should be noted that when RO differs from R'O in Formulas III and IV, scrambling of these groups by transesterification occurs to some extent during the polymerization reaction. Thus, in some of the homopolymers represented by Formula III and copolymers represented by Formula IV, RO will be replaced at some positions by R'O and R'O will be replaced at some positions by RO.

A wide variety of esters of methacrylic acid can be used in preparing the precursors of the polymers of the invention. Mixtures of these esters can also be used. Generally, however, the esters which can be used are those having the formula

wherein R" is an alkyl group, preferably having 1 to 24 carbon atoms, most preferably 1 to 18 carbon atoms. In a preferred embodiment of the invention, R", whether substituted or unsubstituted, will have a total of up to 6 carbon atoms.

Among the esters embraced by formula V are alkyl methacrylates, in which the alkyl group can have branched- or straight-chain, cyclic or acylic spatial configurations, such as methyl methacrylate, ethyl methacrylate, propyl and cyclopropyl methacrylates, butyl and cyclobutyl methacrylates, pentyl and cyclopentyl methacrylates, hexyl and cyclohexyl methacrylates, heptyl and cycloheptyl methacrylates, octyl methacrylates, nonyl methacrylates, decyl methacrylates, undecyl methacrylates, lauryl methacrylates, myristyl methacrylates, cetyl methacrylates, stearyl methacrylates, and the like.

As noted above, the precursors of the polymer compositions of the invention are produced by the anionic polymerization of the suitable monomer or monomers in the presence of an alcohol and an alkoxide catalyst. The final average molecular weight of the polymers produced in the anionic polymerization is a direct function of the overall molar ratio of the alcohol to the monomer. It has been found that two general approaches can be taken to obtain control of polymer molecular weight and molecular weight distribution to produce the polymer compositions of the invention.

In the first approach, which is a one-stage polymerization reaction, the molar ratio of the chain-regulating alcohol to the total monomer charge is maintained at a relatively constant value by addition of the alcohol throughout the polymerization reaction. Generally, it has been found that higher alcohol to monomer ratios will lead to slower polymerization rates and lower average molecular weight polymer compositions, while lower alcohol to monomer ratios will lead to faster polymerization rates and higher average molecular weight polymer compositions. Thus, by manipulating the molar ratio of the total quantity of the alcohol to the total monomer charge, some control of the molecular weight distribution of the polymer compositions of the invention can be obtained. Generally, the molar ratio of the alcohol to the total monomer charge will be from about 1:4 to about 1:50, and preferably from about 1:4 to about 1:25.

Either a batch or a gradual addition process can be employed to obtain the desired alcohol to monomer ratio. In the batch process, alcohol is added, at a rate consistent with the conversion of monomer to polymer, to a suspension or solution of the alkoxide catalyst in a solution of a portion of the total alcohol charge in the entire monomer charge. Generally, in the batch process, the concentration of the alcohol in the reaction mixture is kept relatively constant at about 0.05 to about 5 molar % of the total monomer charge, and preferably at about 0.1 to about 3 molar % of the total monomer charge. In the gradual addition process, both the monomer and the alcohol are gradually added to a suspension or solution of the alkoxide in an inert solvent or in a portion of the total monomer charge. The alcohol and the monomer can be gradually added to the polymerization separately or a solution of the alcohol in the monomer can be added. Generally, in the gradual addition process, the alcohol will be present at a level of about 2 to about 40 molar % of the total monomer charge, and preferably about 5 to about 25 molar % of the total monomer charge. At the conclusion of the addition of the alcohol or of the monomer and alcohol and a short holding period for polymerization to be completed, the alkoxide catalyst is neutralized with a suitable acid, such as a mineral acid or a carboxylic acid, as for example acetic acid, and the resultant salt is removed by filtration or washed from the reaction mixture with water. If a solvent is present, it can be removed by conventional techniques, such as evaporation or distillation under reduced pressure or extrusion.

In the second, and preferred, approach to making the polymer compositions of the invention, the polymers are produced in a two-stage procedure. As in the previous approach, the final average molecular weight is determined by the final ratio of total monomer to alcohol, but a narrower distribution about the average molecular weight can usually be achieved. In the first stage of the polymerization reaction, a polymer having a low molecular weight distribution, for example in which $n$ in Formula III is about 2 to 6, with an average of 3 to 4, is prepared by the batch or gradual addition techniques described above, using about 20 to about 60% by weight of the total monomer charge, and using a relatively high alcohol concentration, generally about 20 to about 50 mole % of the initial monomer charge. The remainder of the monomer charge, generally about 40 to about 80% by weight of the total monomer charge, is then added to the reaction mixture. The addition of the remaining monomer is exothermic and leads to a revised molecular weight distribution. This final average molecular weight distribution is determined by the molar ratio of the alcohol to the total monomer charge. The resulting polymer composition can then be worked up and purified as described above.

The rate of polymerization is influenced by many reaction variables, including the type and concentration of catalyst, the reaction temperature, the relative acidity of the chain-regulating alcohol, and particularly by the concentration of the chain-regulating alcohol in the reaction mixture at any given time.

The above polymerization reactions are generally run at a temperature of about 40° to about 130° C., and preferably about 60° to about 95° C. Since the polymerization reaction in these processes is exothermic, temperature control generally is maintained either by reflux or by external cooling. Although no solvent is necessary to carry out these polymerization reactions, a suitable organic solvent which is inert under the reaction conditions, such as toluene, xylene, or the like, can be employed. It may be particularly advantageous under some polymerization conditions to employ a solvent, for example, at about 10 to 20% by weight, in the later stages of the polymerization to maintain a viscosity which is more convenient for handling. The polymerization reaction is generally conducted at atmospheric pressure, although super- or sub-atmospheric pressures may be advantageous under some conditions.

The polymerizations of the invention are catalyzed by alkoxides. A wide variety of alkoxides can be used in the polymerizations of the invention, and generally any alkoxide derived from an alcohol having the formula R"OH, where R" is as defined in Formula V above, can be used. Mainly for economic reasons, simple normal alkoxides such as those of potassium and sodium, and particularly sodium methoxide and potassium methoxide, are preferred as catalysts. Mixtures of alkoxides can also be used. However, by suitable choice of alkoxide, the rate of polymerization can be influenced greatly. The solubility of the alkoxide and the counter ion are factors which must be considered in assessing this influence. A polar organic cosolvent, such as, for example, dimethylformamide or dimethylsulfoxide, can also be used advantageously under some reaction conditions to improve the solubility and consequently the efficiency of the catalyst. Generally, the alkoxide will be present in the reaction mixture at a concentration of about 0.4 to about 4 mole %, and preferably about 0.6 to about 3.0 mole %, based on the total monomer charge.

Pendant acrylate and methacrylate functionality is introduced into the polymers of the invention by esterification of an acid-containing polymer of the invention with a glycidyl acrylate of methacrylate, or similar ester of acrylic or methacrylic acid, by reacting a polymer of the invention having glycidyl functionality with acrylic or methacrylic acid, using a quaternary ammonium catalyst, or by reacting a polymer of the invention having hydroxyl functionality with a lower alkyl ester of acrylic or methacrylic acid, using a strong acid catalyst. These polymers which contain unsaturation can be cured by conventional thermal means or by actinic, ultraviolet, or electron beam radiation, in the presence of a suitable initiator, such as benzoin methyl ether, diphenyldisulfide, benzophenone, triphenylphosphine, or the like. The radiation curable coatings are especially adaptable for formulating fast-drying printing inks, wood coatings, can coatings, and the like.

Among the preferred polymers of the invention having pendant acrylate or methacrylate functionality are the reaction products of the bis-, tris-, and higher acid-containing polymers of the invention with glycidyl methacrylate, having a weight average molecular weight of about 700 to 2500.

Polymers having hydroxyl functionality from which the polymers of the invention can be obtained are generally prepared by post-reacting a polymer of the invention, such as by transesterifying the ester groups with a polyhydroxy alcohol or esterifying a carboxyl functional polymer, prepared as described below, with a polyhydroxy alcohol. Polymers of the invention having hydroxyl functionality can also be prepared by using a monomer having hydroxyl functionality, such as hydroxyethyl methacrylate, hydroxypropyl methacrylate, or the like, or by carrying out the polymerization reaction in the presence of a polyhydroxy alcohol, such as ethylene glycol, propylene glycol, or the like.

Polymers having carboxyl functionality from which the polymers of the invention can be obtained are generally prepared by the hydrolysis of the ester groups in the polymer to the corresponding acid groups. Using conventional saponification procedures, it has been found that this hydrolysis under alkaline conditions proceeds relatively rapidly to yield selectively a monomcarboxylic acid having Formula VI.

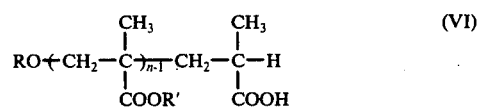

Continued saponification selectively yields at a slower rate a dicarboxylic acid having Formula VII.

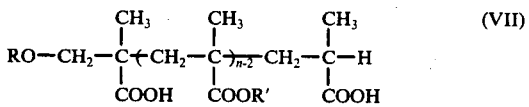

(VII)

wherein RO, R'O, and n are as defined above. Further saponification can be carried out to give polycarboxylic acids, and by control of reactant concentrations and reaction time, any desired degree of hydrolysis can be obtained. However, since saponification of the residual internal ester groups proceeds at a much slower rate than that of the end groups, selective conversion of the methacrylate polymers to either monocarboxylic or dicarboxylic acids can be accomplished.

The polymer compositions of the invention have a wide variety of uses, including applications in forming films, coatings, such as in paints, lacquers, varnishes, printing inks and the like, powder coatings, impregnants, and adhesives for both natural and synthetic materials, such as paper, textiles, wood, brick, stone, ceramics, plastics, metal, and leather. Pigments, dyes, fillers, antioxidants, antiozodants, stabilizers, flow control agents, or other optional ingredients can also be included in polymer compositions of the invention.

When used as coatings, fillers, or adhesives, the polymer compositions of the invention can be applied with or without a solvent by casting permanently or removably onto a suitable substrate. However, one of the advantages of the present invention is that reactive polymers can be prepared which can be applied as radiation- or thermally-cured coatings, fillers or adhesives without the use of any solvents, in either solid or liquid form as 100% solids compositions, or with a solvent in high solids compositions having less than 100% solids. For example, when water or an organic solvent is used, the reactive polymers are advantageously formulated at about 50 to about 100% by weight solids, and preferably greater than about 70 by weight solids. Among the organic solvents which can be used to formulate polymers of the invention and reactive polymer systems incorporating these polymers are hydrocarbons such as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers, such as diethyl ether, the monoethyl ether of ethylene glycol, the monomethyl ether of ethylene glycol, and the monobutyl ether of ethylene glycol; and miscellaneous solvents including dimethylformamide, dimethylacetamide, acetonitile, nitromethane, nitroethane, nitropropane, and nitrobutane; as well as mixtures of two or more solvent materials listed above. These properties are particularly desirable since minimization or elimination of volatile organic solvents also minimizes or eliminates potential ecological hazards.

Polymers of the invention can also be used in preparing powder coatings. The polymers are isolated, powdered, formulated, applied, and cured by conventional means to produce the desired coatings.

The following examples will further illustrate the invention but are not intended to limit it in any way. All parts are by weight and all temperatures are in degrees Centigrade, unless otherwise noted. Example 1 shows three typical polymerization processes used to make polymers from which the polymers of the invention are in turn derived. Examples 2 to 20 show additional polymers which can be used as precursors in making the polymers of the invention. Examples 21 to 30 show other intermediate polymers, as well as the polymers of the invention and their uses.

EXAMPLE 1

Homopolymerization of Methyl Methacrylate

Method A

This example shows a typical homopolymerization of an ester of methacrylic acid according to the "batch-type" polymerization process of the invention.

A clean, dry 3-neck flask equipped with mechanical stirrer, condenser and thermometer in a Y-arm side inlet, under dry nitrogen, is charged with commercially pure methyl methacrylate monomer, inhibited with 10 ppm of phenothiazine or dicyclohexyl phenylene diamine. The stirred solution is heated; upon warming to 60° C., it is charged wth 0.6 mole % sodium methoxide and 3.0% methanol (added as a 25% by weight solution in methyl alcohol). The cloudy white mixture is heated to 93° C. over a 6-minute period and as the 75°–80° C. temperature is passed, methanol addition in aromatic solvent (xylene, toluene) is started via the side arm inlet at the rate of 0.35 mole % per minute for a period of 33 minutes (to a total of 15 mole % methyl alcohol addition). The gradually thickening and clearing solution is maintained at 93° ± 1° C. with stirring for an additional 2 hours. Xylene or toluene is added as diluent as needed for viscosity control. Analysis of the product solution by gas-liquid chromatography upon completion of the reaction time discloses less than 2% of residual methyl methacrylate and a trace (< 0.1%) of methyl alcohol. Dimer and trimer levels are less than 3–4% and less than 8–10% by weight, respectively, as determined by quantitative gas-liquid chromatography and confirmed by gel permeation chromatography. The yellow to yellow-orange mixture is cooled to 60° C., the basic components are quenched with acid (for example, acetic, formic, HCl, H$_2$SO$_4$) removing essentially all color, and 1% by weight of a suitable filter aid is dispersed and stirred for 5–10 minutes. Pressure or aspirator filtration results in greater than 94% by weight, recovery of a clear, colorless to light straw solution of methyl methacrylate polymer. Analysis by gel permeation chromatography shows symmetrical weight distribution around 700–900 M.W., with greater than 85% by weight in the range of 300–1200. Unsaturation determination with solvent-stripped product typically shows less than 0.07 meq./g.

Similar procedures with differing methanol addition rates at constant catalyst level and 93° C. give the product distribution in Table I.

TABLE I

| Methanol Addition Rate (Mole %/Min.) | Total Alcohol Level (Mole % of Methyl Methacrylate Charged) | Product Appearance and Molecular Weight Distribution[1] |
|---|---|---|
| 0.45 | 20 | Oil; 300–900 |
| 0.30 | 12–13 | Syrup[2]; ~400–1500 |
| 0.20 | 11 | Semi-Solid; 600–1600 |
| 0.10 | 8–9 | Brittle Solid M.P. >40° C.; 800–3000 |
| 0.05 | 7 | Brittle Solid M.P. ~50–80°; 1000–4000 |
| None | 3 | Brittle Solid |

TABLE I-continued

| Methanol Addition Rate (Mole %/Min.) | Total Alcohol Level (Mole % of Methyl Methacrylate Charged) | Product Appearance and Molecular Weight Distribution[1] |
|---|---|---|
| | | M.P. ~50–80°; 1000–10,000 |

[1] greater than 85% of the product weight contained in the limits specified; by gel permeation chromatography.
[2] At 80% by weight in solvent.

Method B

This example shows a typical homopolymerization of an ester of methacrylic acid according to a gradual addition polymerization process of the invention.

To the apparatus described in Method A is charged 1.0 to 1.2 mole % (based on monomer to be subsequently added) of powdered potassium tert-butoxide or methoxide to enough toluene or xylene diluent to form a stirrable slurry. A solution of methyl methacrylate containing 15 mole % methanol, neat or about 10% by weight of toluene or xylene for viscosity control, is added dropwise to the stirred catalyst slurry at 65° C., at a rate sufficient to maintain reaction (added at 1.3–1.5% per minute for the first half of addition and about 1.0% per minute for the second half). The mixture readily takes on a pale yellow color and the viscosity noticeably increases after several percent of the monomer solution is added. Aliquots taken during and following monomer/alcohol addition establish that high conversion polymerization, with molecular weight distribution essentially constant, occurs throughout the addition period, that less than 10% residual monomer remains at the completion of addition. A short holding time at 65° C. reduces monomer levels to about 2%.

Following a 20 to 30 minute hold, the nearly clear, yellow oil is cooled to 60° C., quenched with 1.0–1.2% acetic acid (removing almost all color), treated with 1% by weight of a filter aid and vacuum or pressure filtered at 60° to 80° C. Gel permeation chromatography of the clear, colorless to light straw colored oil discloses the major weight fraction to be about 1200, with 90% by weight spread between 300 and 2600. Lower methanol levels yield successively higher molecular weight products of somewhat broader molecular weight distribution (See Table II).

TABLE II

Methyl Methacrylate Polymerization, Gradual Addition Process at 65° C.

| Methanol Level | Product $\bar{M}w$ (and 90 wt. % distribution) | |
|---|---|---|
| 20% | 1100–1200 | (300–2500) |
| 16 | 1200 | (300–2600) |
| 12 | 1600–1700 | (350–3500) |
| 10 | 1800 | (350–4000) |

Method C

This example shows a typical homopolymerization of an ester of methacrylic acid according to the two-stage polymerization process of the invention.

To the apparatus described in Method A is charged 2.24 g. (20 mmole, 1.0 mole % based on total monomer) of powdered potassium tert-butoxide (or an equivalent molar charge of potassium methoxide) and about 10 g. xylene to form a stirrable slurry. Monomer solution (a) is prepared with 80 g. (0.80 mole, 40% of total monomer) methyl methacrylate, inhibited with 3 ppm dicyclohexyl phenylenediamine, and 9.6 g. (0.30 mole, 37.5 mole % of the initial methyl methacrylate charge, 15% of total monomer charge) anhydrous methanol; solution (a) is added over a 30 to 45 minute period to the stirred catalyst slurry at 60° to 65° C. The exotherm observed during the early stages of addition subsides and reaction temperature is maintained throughout addition and for a 45 minute post-addition hold. The reaction mixture is a mobile, hazy orange-yellow liquid containing 5–10% of free methyl methacrylate and 90–95% as dimer through hexamer ($n = 2$–$6$).

Monomer solution (b), consisting of 120 g. (1.20 mole, 60% of total monomer charge) methyl methacrylate and 25 g. xylene, is added dropwise over a 1 hour period at 60°–65° C. Exotherm occurs throughout this addition; gas-liquid chromatography of reaction aliquots discloses monomer levels at less than 1% and gel permeation chromatography indicates polymer growth paralleling addition. After the addition of solution (b), the hazy orange syrup (viscosity about 300 cps at 65°) is held at this temperature for 15 minutes, reducing methyl methacrylate level to essentially nil, and the catalyst is then quenched with 1.2 g. (20 mole) acetic acid. One gram of a filter aid is added to the nearly colorless syrup and dispersed with stirring for 5 to 10 minutes.

Vacuum or pressure filtration of the warm oil through warm funnel affords the product as a clear, light straw to colorless syrup in greater than 98% recovery. Gel permeation chromatography discloses $\bar{M}w$ approximately 720–750, with the distribution 300–1300.

When a total of 20 mole % methanol is used in the above procedure, polymer is obtained in greater than 95% yield with $\bar{M}w$ about 620, spread from 250 to 1100.

In general, potassium n-alkoxides are preferred. Preparations made solely with initially soluble sodium methoxide as the catalyst are also successful, but require approximately 4 to 5-fold longer reaction times for 95% conversion at 90°–93° C. Gel permeation chromatography discloses a similar $\bar{M}w$, at 750–800 with a slightly broader distribution, 300 to 1600. Mixtures of potassium and sodium alkoxides can be used as catalyst to optimize the polymerization efficiency under different reaction conditions. While each of the above three methods can be used to prepare polymers of the invention, Method A and Method C are generally preferred since they yield polymeric products having narrower molecular weight distribution.

EXAMPLES 2 to 20

Preparation of Methacrylate Homopolymers and Copolymers

Following the procedures of Example 1, a wide variety of methacrylate homopolymers and copolymers are prepared. Table III summarizes the polymerization conditions and properties of some typical methacrylate polymers of the invention.

TABLE II

Methacrylate Homo- and Co-Polymers

| Ex. | Monomer(s)[1] | Method[2] | Conversion[3] (Hours) | Alcohol Level[4] | Product $\bar{M}w$[5] | Chain Length[7] |
|---|---|---|---|---|---|---|
| 2 | MMA | A (93°) | 97.3% (2.5) | 18% (0.35) | 700 300–1100[6] | 6–7 (3–11) |
| 3 | MMA | A (93°) | 97 | 15 | 750 (300–1600)[6] | 7 (3–16) |

TABLE II-continued

Methacrylate Homo- and Co-Polymers

| Ex. | Monomer(s)[1] | Method[2] | Conversion[3] (Hours) | Alcohol Level[4] | Product $\overline{M}w$[5] | Chain Length[7] |
|---|---|---|---|---|---|---|
| 4 | MMA | A (93°) | (2.5) 97 | (0.3) 8 | 1600 (80%, 400–1300) (500–2500) | ~16 (5–25) |
| 5 | MMA | B (65°) | (2.0) 96 | (0.1) 12 | 1600 (400–3300) | ~16 (4–33) |
| 6 | MMA | B (80°) | (1.5)[8] 96 | 16 | 1200 (80%, 430–2500) (300–2400) | ~12 (3–24) |
| 7 | MMA | B (100°) | (2)[8] >90 | 15 | 1600 (400–2500) | 16 (4–25) |
| 8 | MMA | C (65°) | (5–6) 99% | 15 | 750 (300–1600) | 7–8 (3–16) |
| 9 | MMA | C (65°) | (2)[8] 95 | 20 | 620 (80%, 430–1300) (250–1100)[6] | 6 (2.3–11) |
| 10 | MMA | C (93°) | (ca. 4)[8] >90 | 15 | 800 (300–1600)[6] | 7–8 (3–16) |
| 11 | BMA | A (98°) | (6)[9] 95 | 11 | 1400 (400–3200) | ~10 (3–23) |
| 12 | BMA | B (80°) | (3) 96 | (0,2) 12 | 2400 (400–6000) | 16–17 (3–40) |
| 13 | BMA | B (80°) | (2.2)[8] 96 | 15 | 1600 (400–5800) | 11 (4–40) |
| 14 | EMA | B (75°) | (2.2)[8] 96 | 15 | 1600 (350–6500) | 14 (3–60) |
| 15 | BMA | C (80°) | (2.5)[8] 99 | 15 | 1000 (80%, 450–5200) (350–2200) | 6–7 (3–15) |
| 16 | 80 MMA/20 BMA | A (93°) | (4)[8] 96 | 15 | 1000 (350–1800)[6] | 9 (3–16) |
| 17 | 50 MMA/50 BMA | A (93°) | (2.5) 95 | (0.35) 11 | 1100 (400–2200) | 9–10(4–18) |
| 18 | 77 MMA/23 LMA | A (93°) | (3.0) 95 | (0.2) 13 | 1100 (400–2500) | ~8 (2–18) |
| 19 | 75 MMA/25 i-BMA | B (95°) | (2) 80 (incomp. at 4) | (0.3) 5 | 1400 (400–3000) | 13 (4–27) |
| 20 | 50 MMA/50 i-BoMA | B (95°) | 93 (5) | 7 | — | — |

Additional Notes:

[1] The following abbreviations are used: MMA = methyl methacrylate; EMA = ethyl methacrylate; BMA = butyl methacrylate; LMA = lauryl methacrylate; i-BMA = isobutyl methacrylate; i-BoMA = isobornyl methacrylate.
[2] A = Method A in Example 1; B = Method B in Example 1; C = Method C in Example 1; reaction temperature in ° C. in parentheses.
[3] Conversion determined by residual monomer via gas liquid chromatography; catalyst is 0.6 mole % $NaOCH_3$ in 3.0 mole % methanol unless otherwise noted.
[4] Method B, mole %-alcohol on monomer; Method A, total mole % alcohol on monomer (added at the indicated mole %/min.); Method C, on total monomer, added first stage.
[5] Weight average molecular weight ($\overline{M}w$) as determined by standardized gel permeation chromatography, based on methyl methacrylate polymer calibration (> 90 wt. % included in the M.W. distribution listed parenthetically); 80% distribution given in several typical examples.
[6] The lower $\overline{M}w$ polymers (i.e. those of $\overline{M}w$ less than 1300) contain about 4–8% by weight of polymer molecules under M.W. 400.
[7] Determined as in footnote 5; represents n in Formula III or (n' + n'') in Formula IV.
[8] The catalyst is 1.0–1.5 mole % powdered potassium t-butoxide or potassium methoxide.
[9] Sodium methoxide catalyst in methanol; reaction terminated before complete conversion.

EXAMPLE 21

Preparation of Mono- and Bis-Carboxylic Acids

The following procedure is representative of the preparation of mono- and bis-carboxylic acids with known molecular weight distribution from which the polymers of the invention can be prepared.

Ninety grams of the polymeric BMA (96% by weight in residual BMA monomer) of Example 11 is taken up in 40 g. isopropanol and warmed to 50° C. To the stirred solution is added dropwise 6.9 g. (87 mmole which includes a calculated excess for the residual monomer) of 50% sodium hydroxide and several grams of water. Within several minutes the solution clouds as the lower molecular weight salts such as sodium methacrylate and lower acids precipitate. The mixture is stirred at reflux for two hours, cooled and acidified with 90 mmole HCl in 150 g. water, taking final pH below 3. The bulk of the cooled aqueous layer is decanted and the remaining oily product is washed with two 50 ml. portions of water and separated. The combined aqueous washings are extracted with two 40 ml. portions of toluene and the toluene extracts added to the product. Azeotropic distillation of residual isopropanol, water and butanol to toluene reflux followed by aspirator filtration of the warm product, gives 82 g. (92% recovery) of a pale yellow, nearly clear oil of 95 wt. % solids in toluene, containing 0.44 meq. $CO_2H$ per gram (approximately 7 equiv. percent of total ester functionality).

The bis-acid is prepared similarly, employing approximately twice the level of aqueous sodium hydroxide and a 10 to 12 hour reflux period. Similar work-up gives 76 g. of a clear, colorless viscous oil of 91 wt. % solids in toluene (83% recovery). Titration shows 1.05 meq. $CO_2H$ per gram (approximately 16 equiv. % of total ester functionality).

Gel permeation chromatographic analysis of the acid products discloses the molecular weight distributions to be essentially identical with the neutral ester precursors.

EXAMPLE 22

Preparation of Bis and Higher Carboxylic Acids

The following procedure is representative of a direct saponification to the bis-acid salt followed by a prolonged saponification step and work up for the tris acid. Potassium hydroxide can provide faster rates under mild thermal conditions.

To 1220 g. of a xylene solution of polymeric methyl methacrylate similar to Example 8 (82% solids, prepared with 17% methanol $\overline{M}w$ ca. 740), containing 1000 g. polymer (9.45 ester equivalents) in a 4 l., 3-neck flask, is charged 408g (3.31 mole, 35 equivalent %, 1% excess of theoretical for bis saponification) of approximately 45% by weight aqueous potassium hydroxide (8.12 meq/g). With good agitation, the pale yellow emulsion is held at about 40° C for 1 hour, 60° C for one hour, then further heated, with clearing, to slow reflux with pot temperature maintained at about 80°-82° C for two hours. Aliquot titration discloses that greater than 97% of the hydroxide charged is converted to carboxylate.

To the clear solution at 60° is additionally charged 204 g (1.66 mole, 17.5% of initial ester content, increasing total hydroxide charged to 52.5 mole %, 1.5% excess over tris acid) of approximately 45% aqueous potassium hydroxide (8.12 meq./g.). The pale yellow mixture is returned to full reflux (pot temperature about 82° to 85°) for 6 hours. The clear mobile oil is then distilled slowly to a head temperature of 82°-83°/1 atm (during 1-2 hours, pot temperature to 90° to 95° C) removing about 300 g of combined methanol, $H_2O$ and xylene distillates. Aliquot titration reveals greater than 95% conversion of charged hydroxide to carboxylate (50 mole % conversion, equivalent to 3 carboxylate groups per average chain).

To the solution are added 200 g $H_2O$ and 400 g isobutanol. With cooling to maintain 55 to 60°, 1220 g (5.05 mole, 2% excess) of 40% aqueous $H_3PO_4$ (4.14 m.mole/g. is added over a 20 minute period. The mixture becomes white, thin and heterogeneous. After stirring an additional 15 minutes at 60° to 65°, stirring is stopped, the layers separated cleanly, and the lower water - $KH_2PO_4$ salt layer (about 1750 g) removed through a bottom stop cock. The remaining hazy - white organic layer, consisting of the product in xylene-isobutanol and containing low levels of occluded phosphate salts and water, is azeotroped dry under 150 mm Hg pressure. The mixture clears as salt granules coalesce. The warm mixture is pressure filtered, yielding 1350 g (about 94–96% recovery) of a clear pale yellow oil containing 3.06 meq. carboxylic acid per gram. The solids content of the solution is 60% in xylene-isobutanol, affording a polymeric acid product containing ca. 5.1 meq. $CO_2H$/g solid. Gel permeation chromatographic comparison of the tris acid product with that of the starting methyl methacrylate polymer shows the expected average downward shift of molecular weight about (8 to 10%, representing the weight of methanol lost) and a decrease of several percent in lower polymer content. No substantial change in molecular weight distribution is evident by gel permeation chromatography.

In a determination of functional homogeneity of the product, the tris-acid is precipitated into four factions by the successive, stepwise addition of a non-solvent ($CCl_4$) to an acetone solution of the product. After equivalent vacuum treatment to remove most solvent, each of the isolated fractions melts in the range of 80° to 100° C, contains 4.2–4.7 meq. $CO_2H$/g, and yields essentially identical gel permeation chromatography spectra.

The ammonium and alkali salts of the product yield clear, nearly colorless aqueous solutions above a pH of about 7.5 to 8. They are freed from organic solvents by normal solvent transfer methods (for example, vacuum drying, or extrusion, and dissolution, or azeotropic distillation, etc.).

Bis and higher acids and salts of other polymers and copolymers of MMA, EMA, BMA, MMA/BMA, etc. of Examples 1-20 are similarly prepared. Examples 23 and 24 show two such acid polymers.

EXAMPLE 23

A polymer of methyl methacrylate Mw about 700 similar to that of Example 8 at 80% solids content in toluene/xylene is treated in one charge with 55 to 56 eq. % of 50 wt. % aqueous NaOH (based on total equivalents of ester; the level charged is sufficient to provide a theoretical average functionality of 3.1–3.2) at 60° to 85° C during 3–4 hours. Following the distillation of methanol, water and toluene to a head temperature of 84°/1 atm., and a subsequent reflux period of two hours, 95-96% of the caustic charged is in charboxylate form (2.9–3.1 functional). The crude sodium salt is treated with additional water and toluene and acidified with 150 eq. % of aqueous $H_2SO_4$ at 55°-60° C. The lower aqueous layer is drawn off and the remaining organic layer containing the crude oligomeric acid is subjected to drying by toluene azeotrope. The dried product is filtered free of traces of residual inorganic sulfate salts to provide a clear oil in greater than 90% recovery.

The product solution contains 70–80% by weight of acid-containing polymer having an acid number of 260±10 (100% solids), viscosity about 50,000 cps at 75% solids (25° C).

EXAMPLE 24

An polymer of butyl methacrylate, $\overline{M}w$ 1000 (Example 15) at 85–90% solids in toluene is treated with 50 eq. % (based on total ester equivalents) of potassium hydroxide pellets at 60° C. The heterogeneous mixture is stirred at full reflux (85°-105° C.) for 1-2 hours until exotherm is established and the pellets dissolve and react. After two additional hours at reflux, conversion to carboxylate reaches 94% of caustic charged (3.0–3.1/3.3 carboxylate functionality).

The yellow oil is worked up by procedures similar to those of Example 39 and after filtration yields a clear, pale-yellow liquid of 35,000 cps viscosity at 70% solids in toluene/n-butanol/25° C. Acid number (100% solids) is 200.

The following Examples 25 to 27 show the preparation of hydroxyl-containing polymers from which the polymers of the invention can be prepared.

EXAMPLE 25

Polyol Formation from Low Molecular Weight Methyl Methacrylate Polymer and 1,3-Butylene Glycol Transesterification of 155 g. of a methyl methacrylate polymer prepared according to Example 1, having a Mn of 450, with 153 g. (1.7 moles) 1,3- butylene glycol in the presence of 7 g. (62 mmole, 3.6eq. %) potassium tertbutoxide at 100° C., employing a slow nitrogen sparge, yielded 22 g. of distillate in 15.5 hours. Another 2.3 g. distillate resulted after 19 hours at 130° C. following by 0.8 g. distillate after 7 hours at 160° C. The reaction was completed at 200° C. for 16 hours yielding a total of 36 g. distillate. The catalyst was quenched with methanolic HCl; excess methanol and butylene glycol were distilled in vacuo at 150° C./7 mm., ending with a nitrogen sparge. The cooled product was taken up in toluene, treated with filter aid and filtered warm. Removal of toluene in vacuo yielded 205 g. of a clear, light solid with hydroxyl no. 190 and an $\overline{M}n$ of 825 (by ebulliometry).

EXAMPLE 26

Polyol Formation from Low Molecular Weight Butyl Methacrylate Polymer and 1,3-Butylene Glycol Following the procedure of Example 25, 172 g. of a polymer of butyl methacrylate prepared according to Example 1 having an $\overline{M}n$ of 1000, and 77.3 g. (0.86 mole) 1,3-butylene glycol are reacted in the presence of sodium methoxide catalyst at 175° to 200° for 70 hours. Catalyst neutralization, distillation and filtration, as described in Example 25, yielded 173 g. of a light yellow, viscous oil with hydroxyl no. 107 and an $\overline{M}n$ of 1265.

EXAMPLE 27

Polyol Formation from Low Molecular Weight Methyl Methacrylate/Butyl Methacrylate Copolymer and Ethylene Glycol A 1 liter, four-necked, round bottom flask is fitted with a mechanical stirrer, a nitrogen ebullator, a thermocouple and a temperature controller, a heating mantle atop a pot-lifter, and a condenser atop a Dean-Stark trap. The flask is charged with 441 g (0.533 mole) of a methyl methacrylate/butyl methacrylate polymer similar to the polymer of Example 17 (89% solids in xylene) and 274 g. (4.42 moles) of ethylene glycol. The mixture is heated at reflux at atmospheric pressure while maintaining a gentle nitrogen sparge (about 25 mole./min.) to dry the ethylene glycol by separation of the water-xylene azeotrope. As the lower water layer was drawn off, the temperature of the distillate rises to 150° C., at which point the azeotrope is composed of xylene and ethylene glycol. At the point, the lower layer is returned to the reaction flask while the upper (xylene) layer is removed. This procedure is continued until xylene ceases to codistill with the glycol. The pot temperature then reaches about 195° C.

The dried reaction mixture is cooled to 60° C. and the condenser and Dean-Stark trap are replaced with a distillation head atop a 10 inch column packed with porcelain saddles. The apparatus is provided with an ice-cooled receiver and a dry ice acetone cooled trap. Sodium methoxide solution (19.7 g., 92.7 meq., 25% solution in methanol, 4.7 meq/g. of sodium methoxide) is charged to the flask and heating is begun while a nitrogen sparge of 25 ml./min. is maitained. Distillation is begun as the pot temperature reaches 145° C. The temperature controller is set such that the head temperature is not allowed to exceed 100° C.

After 3 hours, with 61.2 g. of distillate collected, the rate of reaction has slowed considerably. The mixture is cooled to 60° C. and 9.4 g. (44.2 meq.) of a 25% solution of sodium methoxide catalyst in methanol is charged. Heating at 195° C is resumed and over the next 8 hours and an additional 28 g. of distillate is collected. Gas chromatography shows the total distillate to contain 26.8 (0.362 mole) of n-butanol and 36.3 g. (1.134) of methanol from the transesterification reaction plus 26 g. of methanol from the two catalyst charges. The total moles (1.5) of displaced alcohols provides a theoretical hydroxyl functionality of 2.8 for the product. Gas chromatographic analysis of the distillate on the same column operated at 120° C. shows no xylene contamination.

The reaction mixture is cooled to 100° C, 8.1 g (151 meq., 10% excess) granular ammonium chloride is added, and the reaction mixture is maintained at that temperature with vigorous stirring for 1 hour in order to ensure complete catalyst neutralization. Excess ethylene glycol is then distilled at reduced pressure (20 mm.) at a maximum pot temperature of 190° C. and a maximum nitrogen sparge of 800 ml./min. During the distillation, ammonia is vigorously evolved from the decomposition of the ammonium carboxylate salt. When distillation ends, gas chromagoraphic analysis shows the glycol distillate contains an additional 3.32 g. (0.045 mole) of n-butanol, thereby raising the theoretical functionality to 2.9, the reaction mixture is cooled to 140° C and the crude product is taken up in 120 g of xylene. The solution is filtered while hot through a Celite pad and the filtrate is returned to a clean flask. The solution is heated at reflux at atmospheric pressure over a Dean-Stark trap ($N_2$ sparge of 25 ml./min.) to remove remaining traces of ethylene glycol by distillation of the glycol/xylene azeotrope. When glycol distillation ceases, the xylene solvent is removed at reduced pressure, utilmately, at 190° C/20 mm./$N_2$ sparge of 800 ml./min. and then held at these conditions for 1 hour after the apparent end of the distillation.

The product is transferred at 100% solids while warm and provides the following analytical results:

Acid Number: 13.3
Hydroxyl Number: 156.6
$\overline{M}n$ (GPC): 1044; $\overline{M}w/\overline{M}n$: 1.44
Functionality (hydroxyl): 3.2
Total chlorine content: 0.17%
Chloride ion content: 0.01%
Carboxylate ion content: none Similar polyhydroxyl polymers can be made when other alkyl methacrylate homopolymers and copolymers of the invention are reacted according to the general procedures of Examples 25 to 27 with the same or different polyol reactants.

The following Examples 28 to 30 show the preparation and use of the acrylate and methacrylate pendant polymers of the invention.

EXAMPLE 28

Preparation of Acrylate Pendant Polymer

This example shows the preparation of a polymer of the invention having pendant acrylic groups by esterification of an acid-containing polymer of the invention with glycidyl acrylate.

The acid-containing polymer of Example 23 is reacted with 10 equivalent % excess glycidyl acrylate in the presence of tetra-n-propylammonia bromide catalyst and MEHQ/air inhibitor by the following procedure.

A solution of 56.2 g. (3.44 meq./g. of carboxylic acid, 193 meq. total) of the acid-containing polymer in toluene and isobutanol (70% solids) is heated to 100° C. under vacuum to remove solvents which are then replaced with an equal weight of methyl isobutyl ketone, and the system is provided with an air ebullator. Tetra-n-propyl-ammonium bromide (1.5 g., 5.8 meq.) and glycidl acrylate (27.9 g., 212 meq., containing 200 ppm MEHQ inhibitor) are charged to the reaction vessel and the mixture is heated while a gentle stream of air was bubbled through the mixture to a temperature of 80° C. The temperature is maintained at 80° C. for 0.5 hours and raised to 100° C. for 4.5 hours. Titration of an aliquot shows that more than 99% of the original acid has been consumed. The tris-acrylate pendant polymer is concentrated by vacuum distillation to a solids of 80%.

When other acid-containing polymers of the invention, prepared by the procedures of Examples 21 to 24, are reacted with glycidyl acrylate or glycidyl methacrylate by the above procedures, similar acrylate and methacrylate pendant polymers are obtained.

EXAMPLE 29

Preparation of Acrylate Pendant Polymer by Transesterification

This example shows the preparation of a polymer of the invention having pendant acrylic groups by transesterification of a methyl methacrylate homopolymer polyol precursor with ethyl acrylate.

A polyhydroxyl polymer similar to that of Example 27 is prepared by transesterification of a methyl methacrylate homopolymer prepared as in Example 1 ($\overline{M}w = 700$) with diethylene glycol to give a polymer of hydroxyl functionality = 4.3 (hydroxyl number = 220, $\overline{M}n$ by gel permeation chromatogaphy = 1100, $\overline{M}w \sim 1800$).

This polyhydroxyl polymer (71.8 g., 255 meq. of OH) is warmed to 60° C. to achieve fluidity and dissolved in 45 g. (450 meq.) of ethyl acrylate. The reaction vessel is provided with an air ebullator and a gentle stream of air is passed through the solution throughout the course of the reaction. Inhibitor (0.45 g. of MEHQ) and catalyst (1.82 g., 9.6 meq.) of p-toluenesulfonic acid are then charged and the reaction mixture is heated to reflux. Distillate is removed at a reflux ratio of about 10:1 as the temperature of the distillate (azeotrope of ethyl acrylate and ethanol) increases from 800° to 90° C. The head temperature is prevented from exceeding 90° C. by increasing the reflux ratio. The distillate is analyzed by gas liquid chromtography and the reaction is terminated when ethanol formation ceased (head temperature about 95° C.). After that, the conversion is about 80%.

The crude product is stripped of excess ethyl acrylate at reduced pressure, dissolved in toluene (50 ml.) and neutralized by stirring with excess solid sodium acetate (0.87 g., 10.6 meq.) for 1 hour at room temperature. The salts are filtered and the product is concentrated at reduced pressure to give the acrylate pendant polymer at 85% solids content.

When other polyhydroxyl polymer precursors of the invention are reacted with lower alkyl ester of acrylic and methacrylic acid, similar acrylate and methacrylate pendant polymers are obtained.

EXAMPLE 30

Cure of Acrylate-Pendant Polymers With Actinic Radiation

This example shows a typical curing procedure for polymers of the invention which have pendant acrylate or methacrylate functionality.

Samples of the polymers of Examples 28 and 29 irradiated under a 2400 watt, medium pressure mercury vapor source at a distance of 4 inches in the presence of 2.8 weight % benzoin methyl ether photo-nitiator. Films are cast at a thickness of 2 mils. Of these formulations which are representative of the type used in fast drying inks, the polymer of Example 28 becomes tack-free in about 0.3 sec. and the polymer of Example 29 becomes tack-free in 0.4 sec. For comparison, pentaerythritol triacrylate becomes tack-free after about 0.6 sec. of irradiation.

Similar fast cure is obtained with other polymers of the invention having pendant acrylate and methacrylate funtionality. Other related thermal and radiation curing methods can als be used. These polymers are particularly useful when formulated as fast-drying printing inks, wood coatings, can coatings, and particle board fillers.

It is to be understood that changes and variations may be made without depating from the spirit and scope of the invention as defined by the appended claims.

We claim:

1. In an anionically polymerized addition polymer of at least one ester of methacrylic acid the improvement wherein the polymer comprises mers having the formula $$-CH_2-\underset{\underset{COOR}{|}}{\overset{\overset{CH_3}{|}}{C}}-$$

wherein R is an acryloyloxyalkyl or a methacryloyloxyalkyl group, having up to 4 carbon atoms in the alkyl portion, and, optionally, mers derivable from other anionically copolymerizable monomers, and wherein, $\overline{n}$, the average chain length of the polymer, is about 6 to 50 mers.

2. The polymer of claim 1 in which the polymerization is carried out, in the presence of a chain-regulating agent and a catalytic amount of an anion, using controlled rates of addition of at least one of the ester, the chain-regulating agent and the anion.

3. The polymer of claim 2 wherein the anion is an alkoxide.

4. The polymer of claim 3 wherein the chain-regulating agent is an alcohol.

5. The polymer of claim 4 wherein at least about 85% by weight of the molecules of the polymer have chain lengths of about $\sqrt{2\overline{n}}$ to about $2\overline{n}$ mers.

6. The polymer of claim 5 wherein the average chain length is about 6 to about 25 mers.

7. The polymer of claim 5 wherein the polymer also comprises mers having the formula $$-CH_2-\underset{\underset{COOR^1}{|}}{\overset{\overset{CH_3}{|}}{C}}-$$

wherein $R^1$ is a $(C_1-C_{24})$alkyl group.

8. The polymer of claim 7 wherein $R^1$ is a $(C_1-C_4)$alkyl group.

9. The polymer of claim 7 represented by the formula:

$$R''O\!+\!CH_2-\underset{\underset{COOR'}{|}}{\overset{\overset{CH_3}{|}}{C}}\!\!\rightarrow_{\!n'}\!\!+\!M\!\rightarrow_{\!n''}\!\!-H$$

wherein
R"O represents the residue of the chain-regulating alcohol used in the polymerization reaction,
R'O represents the alcohol portion of an ester of methacrylic acid,
M represents the residue of the interspersed comonomer or comonomers, and
$n'$ and $n''$ are integers of one or more, wherein the sum of $n'$ and $n''$ is 3 to 90.

10. A process comprising the steps (1) preparing an anionically polymerized addition polymer of at least one ester of methacrylic acid, optionally, comprising mers derivable from other anionically copolymerizable monomers, and wherein $\bar{n}$, the average chain length of the polymer, is about 6 to 50 mers; and (2) introducing pendant acrylate or methacrylate functionality into the polymer.

11. The process of claim 10 wherein the pendant functionality is introduced by esterifying an acid-containing polymer with a glycidyl acrylate or methacrylate, by reacting a glycidyl functional polymer with acrylic or methacrylic acid or by reacting a hydroxyl functional polymer with a lower alkyl ester of acrylic or methacrylic acid.

* * * * *

UNITED STATES PATENT AND TRADEMARK OFFICE
CERTIFICATE OF CORRECTION

PATENT NO. : 4,064,161

DATED : December 20, 1977

INVENTOR(S) : Sheldon N. Lewis et al

It is certified that error appears in the above-identified patent and that said Letters Patent are hereby corrected as shown below:

In the specification make the following changes:

In column 1, line 8, change "U. S. Ser. No. 3,711,921" to read — —U. S. Ser. No. 371,921— —

In column 10, line 62, change "TABLE II" to read — —TABLE III— —

In column 11, line 1, change "TABLE II" to read — —TABLE III— —

In column 14, line 53, change "Mn of 450," to read — —Mn of 450,— — line 66, change "in vacuo" to read — —$\underline{in\ vacuo}$— —

Signed and Sealed this

Twelfth Day of June 1979

[SEAL]

Attest:

RUTH C. MASON
*Attesting Officer*

DONALD W. BANNER
*Commissioner of Patents and Trademarks*